United States Patent

[11] 3,603,071

[72] Inventors Kevin B. O'Neil
 Akron;
 Cameron R. Fraser, Cuyahoga Falls, Ohio;
 Paul E. Helms, Jr., Fort Knox, Ky.
[21] Appl. No. 30,973
[22] Filed Apr. 22, 1970
[45] Patented Sept. 7, 1971
[73] Assignee The Goodyear Tire & Rubber Company
 Akron, Ohio

[54] CORDS FOR ANNULAR REINFORCING TIRE BELTS
 10 Claims, No Drawings
[52] U.S. Cl. .................................................. 57/140 BY,
  28/75, 57/140 G, 57/157 R, 152/359, 156/110 C
[51] Int. Cl. ........................................................ B60c 9/02,
  D02g 3/04, D02g 3/48
[50] Field of Search ........................................... 57/140 BY,
  140 G, 157 B, 144; 28/75; 152/359; 156/110 C

[56] References Cited
 UNITED STATES PATENTS

| | | | |
|---|---|---|---|
| 2,424,743 | 7/1947 | Davis............................. | 57/140 BY |
| 2,448,782 | 9/1948 | Davis............................. | 57/140 BY |
| 3,091,018 | 5/1963 | Rees.............................. | 57/153 X |
| 3,410,078 | 11/1968 | Freedman et al. ............. | 57/144 |
| 3,419,059 | 12/1968 | Bridce, Jr. .................... | 152/359 |
| 3,422,873 | 1/1969 | Liska............................. | 57/140 BY |
| 3,446,003 | 5/1969 | Kolek et al.................... | 57/140 G |
| 3,495,646 | 2/1970 | Marzocchi..................... | 152/359 |
| 3,554,260 | 1/1971 | Shoemaker et al. ........... | 152/359 |

*Primary Examiner*—John Petrakes
*Attorneys*—F. W. Brunner and Harlan E. Hummer

ABSTRACT: A cord composed of merged or cabled yarns of fiberglass and polyester for reinforcing tire belts.

CORDS FOR ANNULAR REINFORCING TIRE BELTS

BACKGROUND OF THE INVENTION

Fiberglass has a high modulus of elasticity and is, therefore, especially suitable for reinforcing belts used to annularly strengthen pneumatic tires. The belts are stiffer producing a harsher ride than other belts with cords having lower moduli. It has been found that cabling the fiberglass yarn with polyester yarn within certain ranges of mass blending and twist ratios provides an improved cord, which provides a softer ride without seriously affecting the reinforcing capabilities of the belt.

Briefly stated, the invention is in an improved cord for belts used to annularly reinforce pneumatic tires. The fiberglass and polyester yarns, after cabling, have a predetermined twist and mass ratio of fiberglass to polyester.

The finished tire cord is formed by cabling together yarns of polyester and fiberglass. The polyester yarn, preferably, comprises from about 40 to about 60 percent, by weight, of the cord, and the fiberglass correspondingly comprises from about 60 to about 40 percent, by weight, of the cord. Thus, the mass blend ratio of fiberglass yarn to polyester yarn is in the preferred range of about 0.6 to about 1.5.

The fiberglass yarn, after cabling with the polyester yarn, has a residual twist of from about 3.5 to about 7.5 turns per inch. The polyester yarn, after cabling, has a residual twist of from about 0 to about 2 turns per inch. The residual twists of each yarn of the finished cord are in the same direction, e.g., S-direction.

The yarns of fiberglass and polyester, are merged or cabled together by any suitable means which produces or leaves the predetermined desired residual twist in the different yarns. For example, assuming it is desired to obtain a residual twist in the S-direction of 7.5 turns in the fiberglass yarn and 2 turns in the polyester yarn, the fiberglass and polyester yarns, prior to cabling, are given twists in the S-direction of 9.5 and 4 turns per inch, respectively. The two yarns are then cabled together in an opposing Z-direction and given a twist of of 2 turns per inch leaving the desired residual twist in the S-direction of 7.5 turns in the fiberglass yarn and 2 turns in the polyester yarn.

Generally, high cord twist results in higher fatigue resistance and lower strength, whereas low cord twist conversely gives lower fatigue resistance and higher strength. It has been found that using the aforementioned blend or mass ratio of fiberglass to polyester in combination with the specific residual twists in each cord gives optimum cord characteristics suitable for use in annular belts for reinforcing pneumatic tires. The improved cords are separated by weft threads and weaved into a fabric, which is then coated with rubberized material and formed into thin strips or belts. The belts are positioned around an unvulcanized tire body or carcass prior to placing the tread on the carcass. The tire is thereafter vulcanized and the belts act to reinforce the tire annularly.

While certain representative embodiments and details have been shown for the purpose of illustrating the invention, it will be apparent to those skilled in the art that various changes and modifications may be made therein without departing from the spirit or scope of the invention.

What is claimed is:

1. A tire cord for reinforcing belts used for annularly strengthening tires, comprising cabled yarns of fiberglass and polyester, the fiberglass yarn having a residual twist of from about 3.5 to about 7.5 turns per inch after cabling, and the polyester yarn having a residual twist of from about 0 to about 2 turns per inch after cabling, the twists of the yarns being in the same direction.

2. The tire cord of claim 1, wherein the polyester yarn comprises from about 40 to about 60 percent of the tire cord by weight.

3. The tire cord of claim 2, wherein the fiberglass yarn correspondingly comprises from about 60 to about 40 percent of the tire cord by weight.

4. The tire cord of claim 3, wherein the residual twist in each yarn is in an S-direction.

5. The tire cord of claim 4, wherein the yarns are cabled together in a Z-direction.

6. A method of forming a cord for belts used in annularly reinforcing pneumatic tires, comprising the steps of:
   a. twisting fiberglass yarn in a predetermined direction;
   b. twisting a polyester yarn in the same direction; and
   c. cabling the yarns together in an opposing direction such that the fiberglass yarn has a residual twist of from about 3.5 to about 7.5 turns per inch after cabling, and the polyester yarn has a residual twist of from about 0 to about 2 turns per inch after cabling, the residual twists of said yarns being in the same direction.

7. The method of claim 6, wherein the mass blend ratio of fiberglass yarn to polyester yarn is in the range of from about 0.6 to about 1.5.

8. The method of claim 7, wherein the fiberglass and polyester yarns are individually twisted in an S-direction and cabled together in a Z-direction.

9. The method of claim 8, including the steps of:
   d. forming a fabric from the cords and weft threads angularly disposed to the cords; and
   e. covering the fabric and each cord with rubberized material.

10. The method of claim 9, including the step of:
    f. placing a thin strip of the rubberized fabric with the cords around an unvulcanized tire carcass prior to placing the thread around the carcass.